US012675872B2

(12) United States Patent
Lee et al.

(10) Patent No.: US 12,675,872 B2
(45) Date of Patent: Jul. 7, 2026

(54) METHOD OF INSPECTING DEFECTS

(71) Applicant: Samsung Electronics Co., Ltd.,
Suwon-si (KR)

(72) Inventors: Bumjoo Lee, Suwon-si (KR); Jinwoo Lee, Suwon-si (KR); Suyoung Lee, Suwon-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 173 days.

(21) Appl. No.: 18/644,638

(22) Filed: Apr. 24, 2024

(65) Prior Publication Data

US 2025/0014169 A1     Jan. 9, 2025

(30) Foreign Application Priority Data

Jul. 7, 2023     (KR) ........................ 10-2023-0088632

(51) Int. Cl.
G06T 7/00          (2017.01)
G06T 5/20          (2006.01)
(Continued)

(52) U.S. Cl.
CPC ................ G06T 7/001 (2013.01); G06T 5/20 (2013.01); G06T 5/70 (2024.01); G06T 7/11 (2017.01);
(Continued)

(58) Field of Classification Search
CPC .. G06T 7/001; G06T 5/20; G06T 5/70; G06T 7/11; G06T 2207/10061;
(Continued)

(56) References Cited

U.S. PATENT DOCUMENTS 7,336,145 B1 *  2/2008  Zelinski ............. G01R 33/5611
                                                324/309
7,676,077 B2    3/2010  Kulkarni et al.
(Continued)

FOREIGN PATENT DOCUMENTS

JP          7144262 B2     9/2022
KR      10-1285967 B1     7/2013
(Continued)

*Primary Examiner* — Mia M Thomas
(74) *Attorney, Agent, or Firm* — Harness, Dickey & Pierce, P.L.C.

(57)          ABSTRACT

A defect inspection method includes: recognizing image peaks that are reference positions of image patterns included an inspection image; performing filtering on a reference image including reference patterns, recognizing reference peaks, and then selecting some of the reference peaks as peak samples; calculating candidate correction constants by overlapping the filtered inspection image and the filtered reference image, and then selecting a primary correction constant among the candidate correction constants; applying the first correction constant to the reference image and selecting a secondary correction constant by matching the image peaks to the reference peaks included in a primary corrected reference image, and then applying the secondary correction constant to the primary corrected reference image and forming a secondary corrected reference image aligned with the inspection image; and performing a defect inspection on the inspection image by matching the image patterns to reference patterns included in the secondary corrected reference image.

20 Claims, 21 Drawing Sheets

(51) Int. Cl.
*G06T 5/70* (2024.01)
*G06T 7/11* (2017.01)

(52) U.S. Cl.
CPC ............... *G06T 2207/10061* (2013.01); *G06T 2207/30148* (2013.01)

(58) Field of Classification Search
CPC ............ G06T 2207/30148; G06T 7/30; G06V 10/443; H10P 74/23
See application file for complete search history.

(56) References Cited

U.S. PATENT DOCUMENTS

| | | | |
|---|---|---|---|
| 8,041,104 B2 | 10/2011 | Toyoda et al. | |
| 8,229,205 B2 | 7/2012 | Hyon et al. | |
| 9,140,998 B2 | 9/2015 | Smilde et al. | |
| 9,830,421 B2 | 11/2017 | Bhattacharyya et al. | |
| 10,025,199 B2 | 7/2018 | Den Boef et al. | |
| 10,282,510 B2 | 5/2019 | Cilingiroglu et al. | |
| 10,535,129 B2 | 1/2020 | Kitazawa et al. | |
| 10,802,073 B2 * | 10/2020 | Shimoda | G01N 21/9505 |
| 2008/0130982 A1 * | 6/2008 | Kitamura | G06V 10/471 |
| | | | 382/144 |
| 2010/0021824 A1 * | 1/2010 | Preil | G06T 7/001 |
| | | | 430/5 |
| 2011/0194752 A1 * | 8/2011 | Pang | G03F 1/84 |
| | | | 382/149 |
| 2012/0134542 A1 * | 5/2012 | Pang | G06T 7/001 |
| | | | 382/106 |
| 2013/0202187 A1 * | 8/2013 | Goren | G06T 7/0008 |
| | | | 382/145 |
| 2015/0324963 A1 * | 11/2015 | Sezginer | G01N 21/9501 |
| | | | 382/144 |
| 2016/0377561 A1 * | 12/2016 | Ramachandran .. | G01N 21/9501 |
| | | | 250/307 |
| 2017/0276476 A1 * | 9/2017 | Konno | G06T 7/0004 |
| 2018/0087898 A1 * | 3/2018 | Akagi | G01N 21/86 |
| 2019/0096053 A1 * | 3/2019 | Asbag | G06T 7/0004 |
| 2019/0155164 A1 * | 5/2019 | Chen | G01N 21/8851 |
| 2020/0226744 A1 * | 7/2020 | Cohen | G06T 7/11 |
| 2020/0234417 A1 * | 7/2020 | Cohen | G06T 7/001 |
| 2022/0050061 A1 * | 2/2022 | Bar | G01N 21/9501 |
| 2022/0318975 A1 | 10/2022 | Ouchi et al. | |
| 2024/0202879 A1 * | 6/2024 | Lee | G06T 5/50 |
| 2024/0369940 A1 * | 11/2024 | Hsu | G03F 7/70125 |
| 2025/0384556 A1 * | 12/2025 | Jodoin | G06T 7/0014 |
| 2026/0011000 A1 * | 1/2026 | Roy | G06T 7/001 |
| 2026/0026311 A1 * | 1/2026 | Lee | H10P 74/203 |
| 2026/0031301 A1 * | 1/2026 | Lee | H01J 37/28 |

FOREIGN PATENT DOCUMENTS

| | | |
|---|---|---|
| KR | 10-1328611 B1 | 11/2013 |
| KR | 10-1492205 B1 | 2/2015 |
| KR | 10-1918251 B1 | 11/2018 |
| KR | 10-2295266 B1 | 8/2021 |

* cited by examiner

METHOD OF INSPECTING DEFECTS

CROSS-REFERENCE TO RELATED APPLICATION

This application is based on and claims priority under 35 U.S.C. § 119 to Korean Patent Application No. 10-2023-0088632, filed on Jul. 7, 2023, in the Korean Intellectual Property Office, the disclosures of which are incorporated by reference herein in their entirety.

BACKGROUND

The inventive concepts relate to a method of inspecting defects (e.g., a defect inspection method), and more particularly, a method of inspecting defects in a captured inspection image by aligning the captured inspection image taken for defect inspection with a reference image to be compared.

A method of inspecting defects in the process of manufacturing semiconductor devices includes aligning and comparing two or more images, for example, an inspection image and an image to be compared, with each other, and detecting defects from the differences between the two or more images.

However, with the development of electronics technology, down-scaling of semiconductor devices has rapidly progressed, and accordingly, the sizes of the components of the semiconductor devices and the spacing between the components has decreased. Accordingly, it is important to accurately align an inspection image with a reference image to be compared.

SUMMARY

The inventive concepts provide a defect inspection method that increases defect inspection speed by facilitating alignment between an inspection image (e.g., an image for inspection) and a reference image to be compared.

According to an aspect of the inventive concepts, there is provided a defect inspection method including: filtering an inspection image such that image peaks in the inspection image are identified as reference positions of image patterns included in the inspection image; filtering a reference image such that reference peaks in the reference image are identified as reference positions of reference patterns included in the reference image; selecting at least a subset of the reference peaks as peak samples; overlapping the filtered inspection image and the filtered reference image; determining candidate correction constants based on differences in position from the peak samples to corresponding image peaks included in a search range of the overlapped filtered inspection and filtered reference images; selecting a primary correction constant, from among the candidate correction constants, by applying the candidate correction constants to each of the reference peaks of the reference image; applying the primary correction constant to the reference image and selecting a secondary correction constant by matching the image peaks to the reference peaks included in a primary corrected reference image; applying the secondary correction constant to the primary corrected reference image and forming a secondary corrected reference image aligned with the inspection image; and performing a defect inspection on the inspection image by matching the image patterns to reference patterns included in the secondary corrected reference image.

According to an aspect of the inventive concepts, there is provided a defect inspection method including: capturing an inspection image including image patterns using a scanning electron microscope (SEM); filtering the inspection image such that image peaks in the inspection image are identified as reference positions of the image patterns; performing image processing on a design image to fill an interior of a closed contour of design patterns included in the design image; filtering the image-processed design image such that design peaks are identified as reference positions of the design patterns; selecting at least a subset of the design peaks as peak samples; overlapping the filtered inspection image and the filtered design image; determining candidate correction constants based on differences in position from the peak samples to corresponding image peaks included in a search range of the overlapping filtered inspection and filtered design images; selecting a primary correction constant, from among the candidate correction constants, by applying the candidate correction constants to each of the image peaks to the design peaks of the design image; applying the primary correction constant to the design image and selecting a secondary correction constant by matching the image peaks to the design peaks included in a primary corrected design image; applying the secondary correction constant to the primary corrected design image and forming a secondary corrected design image aligned with the inspection image; and performing a defect inspection on the inspection image by matching the image patterns to design patterns included in the secondary corrected design image.

According to an aspect of the inventive concepts, there is provided a defect inspection method including: capturing an inspection image including image patterns using a scanning electron microscope (SEM); filtering the inspection image using a blurring filter such that image peaks in the inspection image are identified as reference positions of the image patterns; performing image processing to fill an interior of a closed contour of each of design patterns on a design image including the design patterns, the design image obtained by extracting a portion corresponding to the inspection image from layout design files composed of Graphic Design System-II stream format (GDSII); filtering the image-processed design image using a blurring filter on such that design peaks in the design image are identified as reference positions of the design patterns; selecting 3 to 5 of the design peaks as peak samples; overlapping the filtered inspection image and the filtered design image; determining candidate correction constants based on differences in from position from the peak samples to corresponding image peaks included in a search range of the overlapping filtered inspection and filtered design images; selecting a primary correction constant from among the candidate correction constants by applying the candidate correction constants to each of the image peaks to the design peaks of the design image; applying the primary correction constant to the design image and selecting a secondary correction constant by matching the image peaks to the design peaks included in a primary corrected design image; applying the secondary correction constant to the primary corrected design image and forming a secondary corrected design image aligned with the inspection image; and performing a defect inspection on the inspection image by matching the image patterns to design patterns included in the secondary corrected design image.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
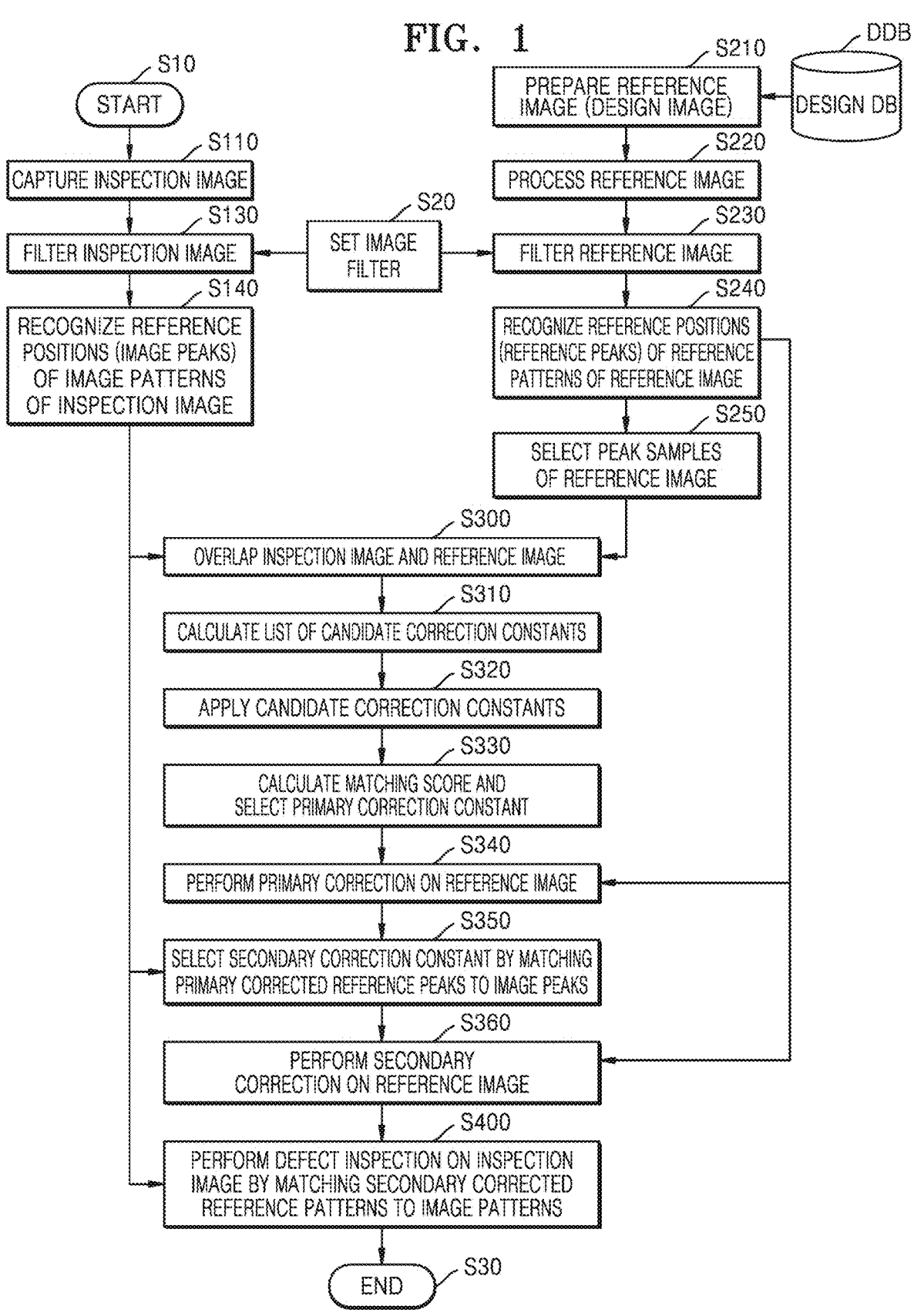
FIG. 1 is a schematic flowchart showing a defect inspection method according to at least one embodiment.
Figure 2A:
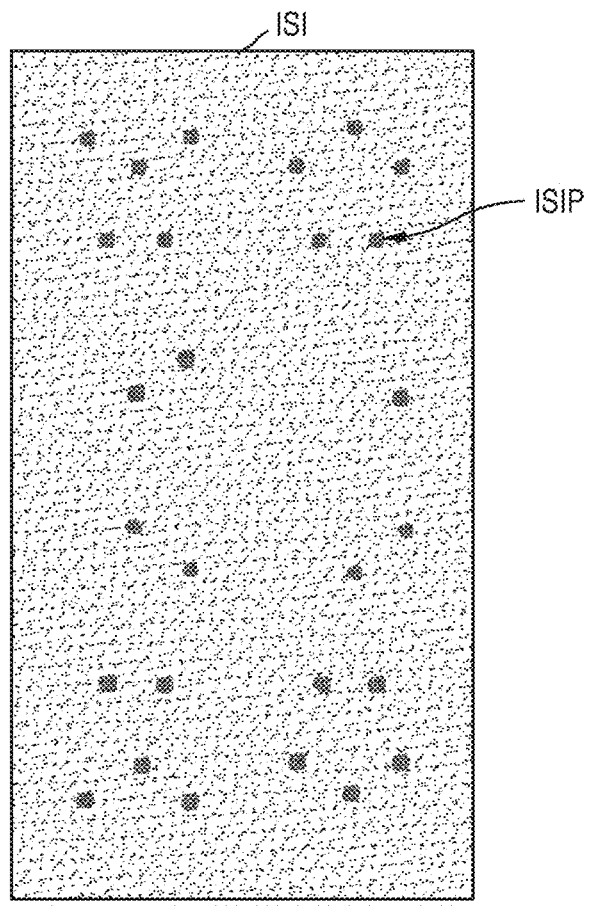
FIGS. 2A and 2B are conceptual diagrams illustrating a process of recognizing a reference position from an inspection image ISI in a defect inspection method according to at least one embodiment.
Figure 2B:
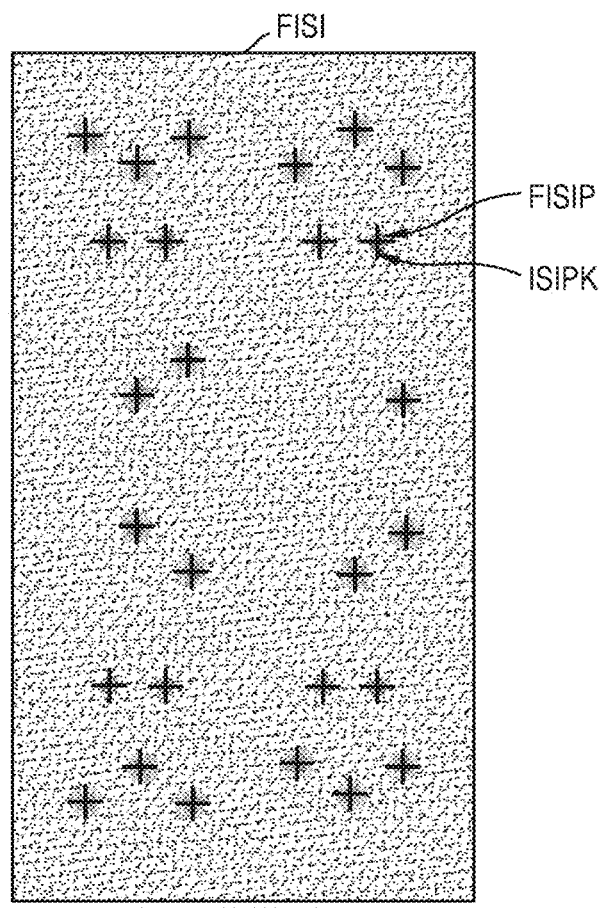
Figure 3A:
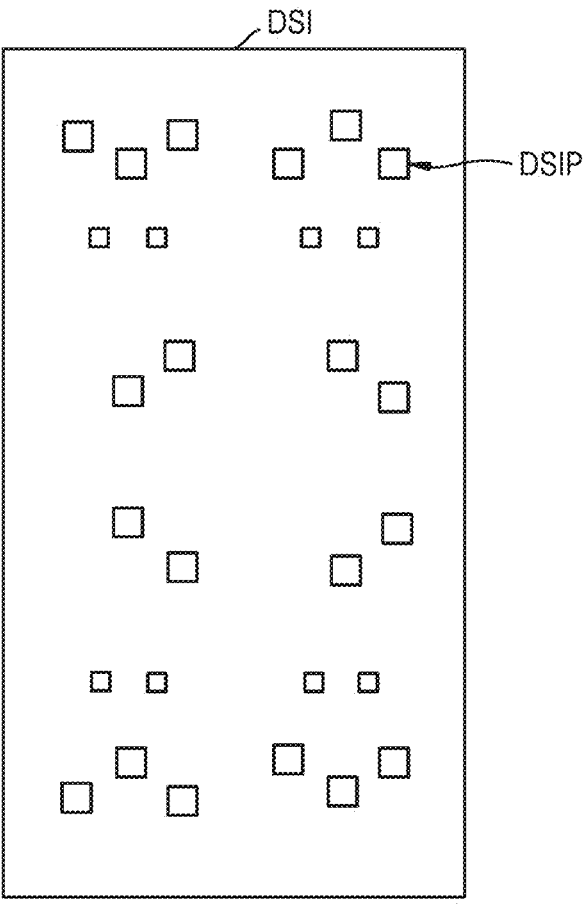
FIGS. 3A to 3C are conceptual diagrams illustrating a process of recognizing a reference position from a design image, which is an image to be compared, in a defect inspection method according at least one embodiment.
Figure 3B:
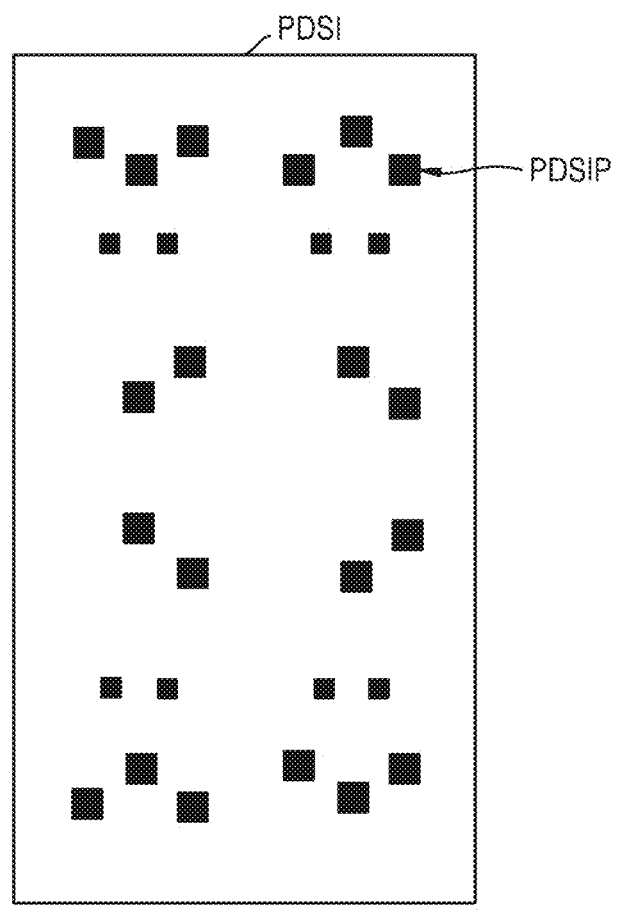
Figure 3C:
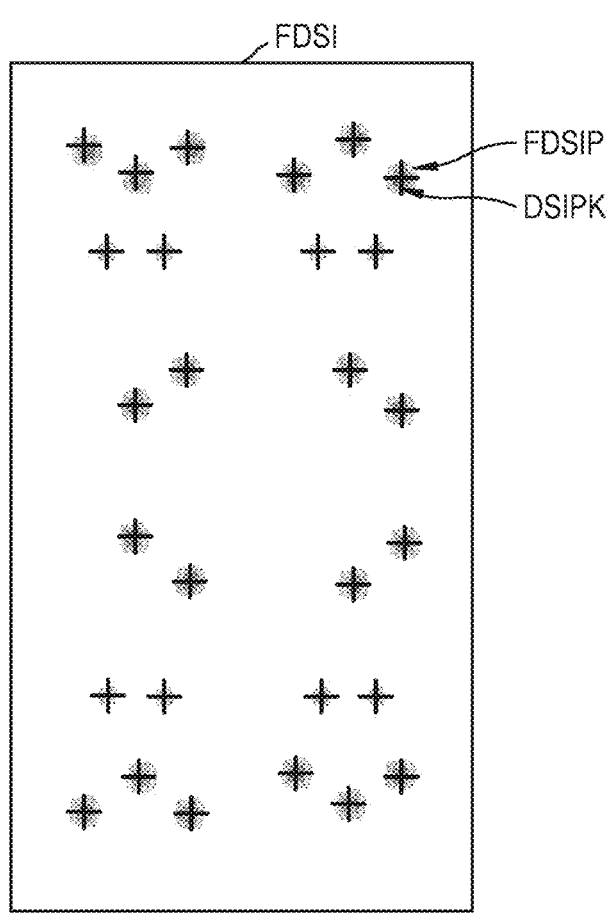
Figure 4:
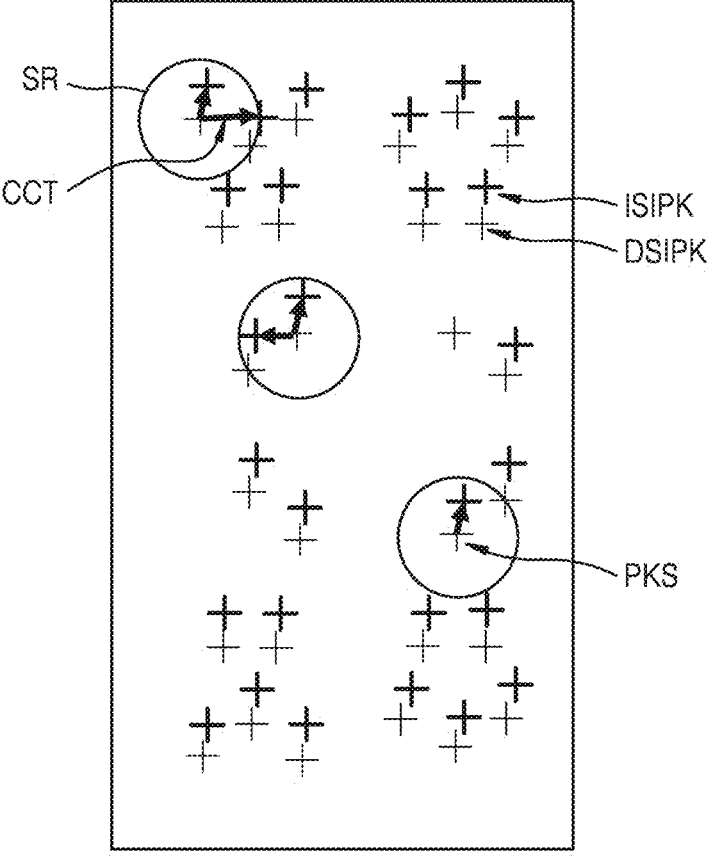
FIG. 4 is a conceptual diagram illustrating candidate correction constants for aligning an inspection image with an image to be compared, in a defect inspection method according to at least one embodiment.
Figure 5A:
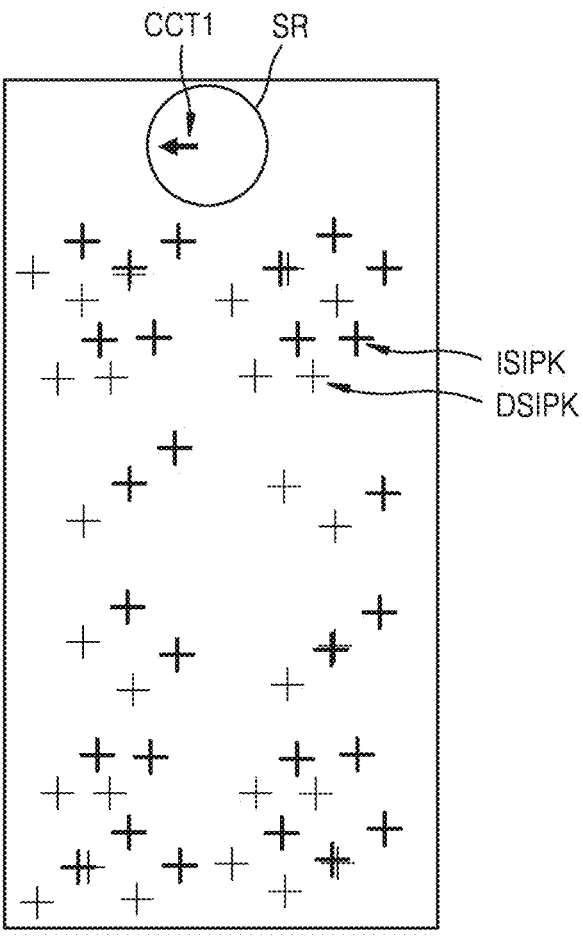
FIGS. 5A to 5C are conceptual diagrams illustrating a process of first correcting a comparison image to align an inspection image with the comparison image in a defect inspection method according to at least one embodiment.
Figure 5B:
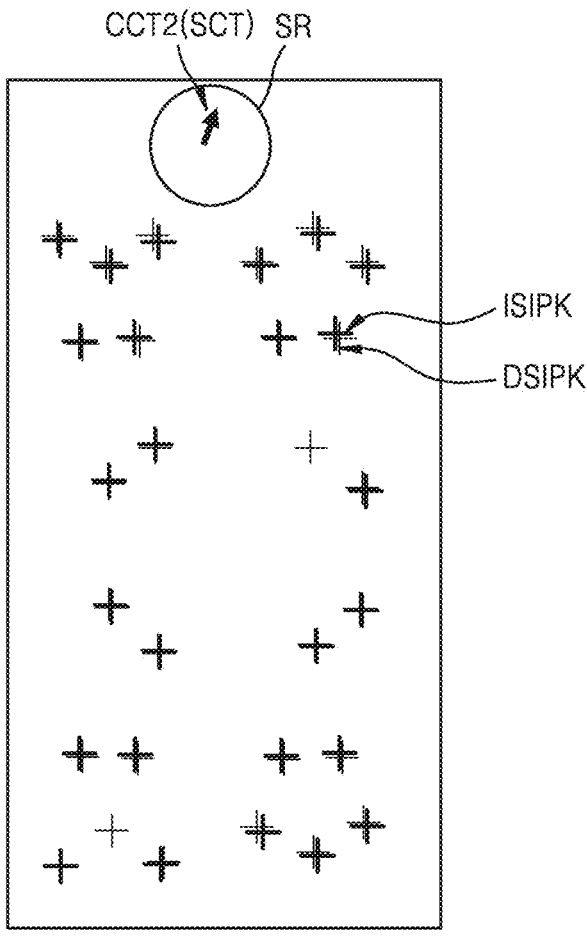
Figure 5C:
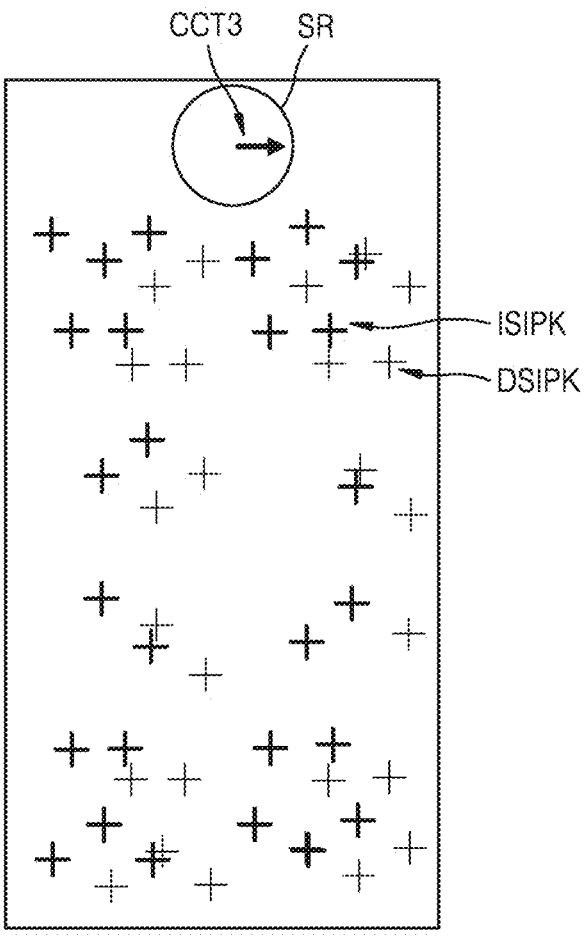
Figure 6:
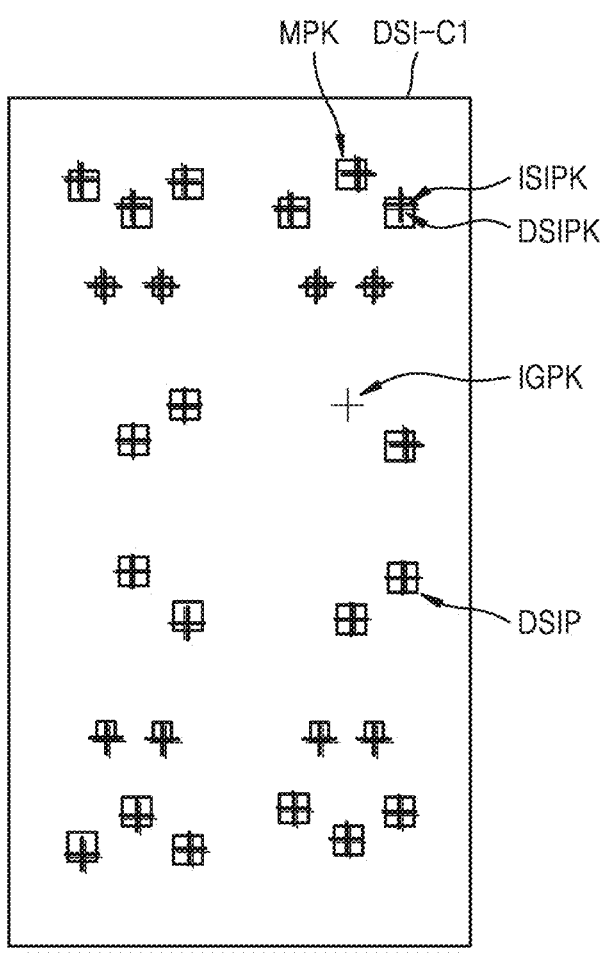
FIG. 6 is a conceptual diagram illustrating a process of second correcting a comparison image to align an inspection image with the comparison image in a defect inspection method according to at least one embodiment.
Figure 7:
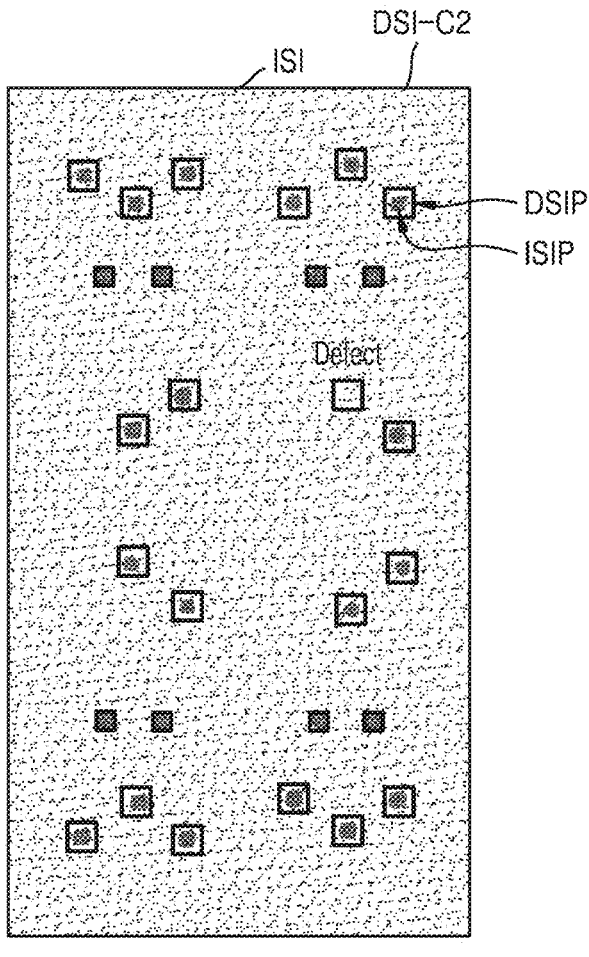
FIG. 7 is a conceptual diagram illustrating a defect inspection method according to at least one embodiment.

FIG. 1 is a schematic flowchart showing a defect inspection method according to at least one embodiment. FIGS. 2A and 2B are conceptual diagrams illustrating a process of recognizing a reference position from an inspection image ISI in a defect inspection method according to at least one embodiment. FIGS. 3A to 3C are conceptual diagrams illustrating a process of recognizing a reference position from a design image DSI, which is an image to be compared, in a defect inspection method according at least one embodiment. FIG. 4 is a conceptual diagram illustrating candidate correction constants for aligning an inspection image with an image to be compared, in a defect inspection method according to at least one embodiment. FIGS. 5A to 5C are conceptual diagrams illustrating a process of first correcting a comparison image to align an inspection image with the comparison image in a defect inspection method according to at least one embodiment. FIG. 6 is a conceptual diagram illustrating a process of second correcting a comparison image to align an inspection image with the comparison image in a defect inspection method according to at least one embodiment. FIG. 7 is a conceptual diagram illustrating a defect inspection method according to at least one embodiment.

Referring to FIG. 1, in order to start alignment and defect inspection of an inspection image (e.g., an image for inspection) ISI in FIG. 2A (operation S10), the inspection image ISI is captured (operation S110). The captured inspection image ISI may also be referred to as a captured image. In at least one example, the inspection image ISI may be captured by an electron microscope. For example, the inspection image ISI may be an SEM image captured with a scanning electron microscope (SEM). Alternatively, the inspection image ISI may be various types of images including optical images captured by inspection equipment for inspecting defects in semiconductor devices. For example, the inspection image ISI may be an SEM image captured during the process of manufacturing a semiconductor device.

In at least one example, the inspection image ISI may be an image captured after performing an etching process during the process of manufacturing a semiconductor device. For example, the inspection image ISI may be an SEM image captured during an after cleaning inspection (ACI). Alternatively, the inspection image ISI may be an image captured after performing a photo process during the process of manufacturing a semiconductor device. For example, the inspection image ISI may be an SEM image captured during after development inspection (ADI). The inspection image ISI may include various types of image patterns ISIP (see FIG. 2A).

In some embodiments, the inspection image ISI may be an achromatic image, such as a black-and-white image including pixels having a gray level. In some other embodiments, for example, the inspection image ISI may be a black-and-white image converted from a color image to consist of pixels having a gray level.

Filtering is performed on the captured image (e.g., the inspection image ISI) (operation S130). For example, the filtering is a process of defining a square matrix (called a filter, kernel, or window), moving the kernel, and multiplying the kernel with the same image area to create a new image with the result of the multiplication as the value of a corresponding position in an image. For example, filtering using a blurring filter or smoothing filter may be performed on the captured image. When filtering is performed on the captured image, a filtered inspection image FISI (see FIG. 2B) is generated. The filtered inspection image FISI may include filtered image patterns FISIP (see FIG. 2B) corresponding to the image patterns ISIP.

An image filter may be set (operation S20) to perform filtering on the captured image that is the inspection image ISI (operation S130). For example, the type of image filter may be set or the filter strength may be set. For example, a blurring filter or a smoothing filter may be set as a filter to be used for the captured image that is the inspection image ISI. When filtering is performed using a blurring filter on the captured image that is the inspection image ISI, an averaging blur filter, median blur filter, Gaussian blur filter, or bilateral blur filter may be set. The averaging blur filter may use a kernel with uniform values and replace a pixel with an average value within a kernel area. The median blur filter may replace a pixel with a median value rather than an average value. The Gaussian blur filter may use a Gaussian function as a kernel, and thus, as the distance difference between a center position and a kernel position increases, the weight decreases. The bilateral blur filter not only puts the distance between two pixels but also the difference between the brightness and darkness values of the two pixels into the kernel and multiplies the kernel with a weight.

In the filtered inspection image FISI, an image peak ISIPK (see FIG. 2B), which is a peak that serves as a reference position of the filtered image pattern FISIP, is recognized in each of the filtered image patterns FISIP (operation S140). For example, in at least example, when, in the filtered inspection image FISI, the background includes pixels with low intensity and the filtered image pattern FISIP includes pixels with high intensity, a pixel with relatively high intensity may be recognized as an image peak ISIPK, which is a reference position of the filtered image pattern FISIP. Although the background may include low-intensity pixels that are close to white and the filtered image pattern FISIP may include high-intensity pixels that are close to black, this is just an example and the inventive concepts are not limited thereto. In some embodiments, the background may include low-intensity pixels that are close to black, and the filtered image pattern FISIP may include high-intensity pixels that are close to white. In the present specification, high and low pixel intensities mean that the difference in intensity is large and small compared to the intensity of pixels included in the background from among the pixels included in the filtered image pattern FISIP.

In one filtered image pattern FISIP, when pixels with relatively high intensity are difficult to distinguish (e.g., because there are too many pixels with relatively high intensity) an image filter may be set to adjust the filter intensity (operation S20).

Separately, a design image DSI (see FIG. 3A), which is an image to be compared, is prepared by extracting a portion corresponding to the captured image from layout design files stored in a design database (DB) DDB (operation S210). In some embodiments, the layout design file and the design image DSI that is part thereof may be composed of Graphic Design System-II stream format (GDSII), Open Artwork System Interchange Standard (OASIS), or the like.

The design image DSI may be composed of straight edges to form a closed contour called a boundary. In the closed contour, the inside of a contour may be referred to as a digitized area. The design image DSI may include a design pattern DSIP that is boundaries corresponding to the image patterns ISIP.

Image processing is performed to fill a digitized area inside a contour included in the design image DSI (operation S220) to thereby form a processed design image PDSI, which is an image to be compared. The processed design image PDSI may include processed design patterns PDSIP (see FIG. 3B) corresponding to the design patterns DSIP. Each of the processed design patterns PDSIP may be a filled polygon.

Afterwards, filtering is performed on the processed design image PDSI (S230). For example, filtering using a blurring filter or smoothing filter may be performed on the processed design image PDSI. When filtering is performed on the processed design image PDSI, a filtered design image FDSI (see FIG. 3C) may be generated. The filtered design image FDSI may include filtered design patterns FDSIP (see FIG. 3C) corresponding to the processed design patterns PDSIP.

An image filter may be set (operation S20) to perform filtering on the processed design image PDSI (operation S130). For example, the type of image filter may be set or the filter strength may be set. For example, a blurring filter or smoothing filter may be set as a filter to be used for the processed design image PDSI. When filtering is performed using a blurring filter on the processed design image PDSI, an averaging blur filter, median blur filter, Gaussian blur filter, bilateral blur filter, or the like may be set.

In the filtered design image FDSI, a design peak DSIPK (see FIG. 3C), which is a peak that serves as a reference position of the filtered design pattern FDSIP, is recognized in each of the filtered design patterns FDSIP (operation S240). A pixel with relatively high intensity may be recognized as a design peak DSIPK, which is a reference position of the filtered design pattern FDSIP. In one filtered design pattern FDSIP, when pixels with relatively high intensity are difficult to distinguish because there are too many pixels with relatively high intensity, an image filter may be set to adjust the filter intensity (operation S20).

Among the design peaks DSIPK of the filtered design patterns FDSIP included in the filtered design image FDSI, peak samples PKS (see FIG. 4) are selected (operation S250). In some embodiments, among the design peaks DSIPK of the filtered design patterns FDSIP, three or more design peaks DSIPK may be selected as peak samples PKS. For example, 3 to 5 design peaks DSIPK among the design peaks DSIPK of the filtered design patterns FDSIP may be selected as peak samples PKS. As for the peak samples PKS, among the design peaks DSIPK, three or more design peaks DSIPK may be selected in order of highest intensity. Alternatively, as for the peak samples PKS, among the design peaks DSIPK, three or more design peaks DSIPK may be selected in order of largest filtered design patterns FDSIP (including the design peaks DSIPK). In some embodiments, within the filtered design image FDSI, design peaks DSIPK that are relatively far apart but have a certain separation distance so as not to be too close to the edge of the filtered design image FDSI may be selected as peak samples PKS. The filtered inspection image FISI and the filtered design image FDSI are overlapped (operation S300), and a search range SR (see FIG. 4) is set from each of the peak samples PKS. In some embodiments, the search range SR may be a circular range. For example, the radius of the search range SR may be set to a value equal to or greater than the stage accuracy of inspection equipment. In some embodiments, the stage accuracy of the inspection equipment may be tens of nanometers, and the radius of the search range SR may be 1 to 3 times the stage accuracy of the inspection equipment.

A list of candidate correction constants CCT (see FIG. 4) is calculated from a position difference from each of the peak samples PKS to an image peak ISIPK (see FIG. 4) included in the search range SR (operation S310). The list of candidate correction constants CCT may include movement correction constants each including, for example, the distance and direction from the peak sample PKS to the image peak ISIPK included within each of the search ranges SR, rotation correction constants that are differences in directions included by two of the movement correction constants, and rotation movement correction constants obtained by combining one movement correction constant of the movement correction constants with one rotation correction constant of the rotation correction constants.

By applying each of the candidate correction constants CCT (e.g., a first candidate correction constant CCT1 in FIG. 5A) a second candidate correction constant CCT2 in FIG. 5B, and a third candidate correction constant CCT3 in FIG. 5C, to the filtered design image FDSI, to move the design peaks DSIPK including the peak samples PKS and/or rotate the filtered design image FDSI including the design peaks DSIPK, the peak samples PKS are respectively matched to image peaks ISIPK closest thereto (operation S320). The average of the distances between the peak samples PKS and the image peaks ISIPK, which are matched to each other, is calculated as a matching score, and the second candidate correction constant CCT2 with the highest matching score (e.g., the smallest distance average) is selected as a primary correction constant SCT (see FIG. 5B) (operation S330). In some embodiments, when the ratio of design peaks DSIPK without an image peak ISIPK within the search range SR from the design peak DSIPK is greater than a set specification in defect inspection performed in the manufacturing process (specification-out), a corresponding candidate correction constant CCT may be excluded from selection.

A primary correction is performed by applying the selected primary correction constant SCT to the design image DSI to thereby generate a primary corrected design image DSI-C1 (see FIG. 6) (operation S340). The primary corrected design image DSI-C1 may include design patterns DSIP and design peaks DSIPK. In some embodiments, the design patterns DSIP and design peaks DSIPK included in the primary corrected design image DSI-C1 may be generated by applying the primary correction constant SCT to each of the design patterns DSIP and design peaks DSIPK included in the design image DSI. The design patterns DSIP and design peaks DSIPK included in the primary corrected design image DSI-C1 may be respectively referred to as primary correction design patterns and primary correction design peaks. In some embodiments, in order to ensure that the primary corrected design image DSI-C1 includes the primary correction design peaks but does not include the primary correction design patterns, the primary correction constant SCT may be applied to each of the design peaks DSIPK, which are included in the design image DSI, in the process of performing a primary correction by applying the primary correction constant SCT to the design image DSI.

A secondary correction constant is selected by matching the design peaks DSIPK included in the primary corrected design image DSI-C1 to the image peaks ISIPK (operation S350). The secondary correction constant may be obtained through regression analysis. For example, the secondary correction constant may be obtained by a method of least squares or a maximum likelihood method.

A secondary correction is performed by applying the secondary correction constant to the primary corrected design image DSI-C1 (operation S360), resulting in a secondary corrected design image DSI-C2 (see FIG. 7) aligned with the captured image, which is the inspection image ISI. The secondary corrected design image DSI-C2 may include design patterns DSIP. In some embodiments, the design patterns DSIP included in the secondary corrected design image DSI-C2 may be generated by applying the secondary correction constant to each of the design patterns DSIP included in the primary corrected design image DSI-C1. The design patterns DSIP included in the secondary corrected design image DSI-C2 may be referred to as secondary correction design patterns.

By matching the design patterns DSIP included in the secondary corrected design image DSI-C2 to the image patterns ISIP, defect inspection may be performed on the captured image, which is the inspection image ISI (operation 400). For example, when there is no image pattern ISIP that matches the design pattern DSIP, and/or when there is no design pattern DSIP that matches the image pattern ISIP, it may be determined that there is a defect and the defect inspection may be terminated (operation S30). Alternatively, when the design patterns DSIP matches the image pattern ISIP, it may be determined that there is not a defect and the defect inspection may be terminated. In at least some embodiments, the semiconductor device corresponding to the captured image may be re-processed and/or discarded based on the determination that a defect exists. For example, in the case wherein the number of defects is less than a threshold value and/or the type of defect is correctable, the semiconductor device may be reprocessed, and/or, in the case wherein the number of defects is greater than a threshold value and/or the type of defect is not correctable, the semiconductor device may be discarded. In the case wherein it is determined that a defect does not exist, the semiconductor device may proceed to further processing and/or packaging.

In the present specification, 'design' included in the name of a member may be replaced with 'reference'. For example, a design image DSI, a filtered design image FDSI, a design pattern DSIP, a filtered design pattern FDSIP, and a design peak DSIPK may be respectively referred to as a reference image, a filtered reference image, a reference pattern, a filtered reference pattern, and a reference peak.

Referring to FIG. 2A, the inspection image ISI may be, e.g., an SEM image captured with an SEM. Alternatively, the inspection image ISI may be various types of images including optical images captured by inspection equipment for inspecting defects in semiconductor devices. For example, the inspection image ISI may be an SEM image captured during the process of manufacturing a semiconductor device. The captured inspection image ISI may be referred to as a captured image.

The inspection image ISI may be an image captured after performing an etching process during the process of manufacturing a semiconductor device. For example, the inspection image ISI may be an SEM image captured during ACI. Alternatively, the inspection image ISI may be an image captured after performing a photo process during the process of manufacturing a semiconductor device. For example, the inspection image ISI may be an SEM image taken during ADI. The inspection image ISI may include various types of image patterns ISIP.

In some embodiments, the inspection image ISI may be an achromatic image including pixels having a gray level. In some other embodiments, the inspection image ISI may be, e.g., a black-and-white image converted from a color image to consist of pixels having a gray level.

The inspection image ISI may be an image captured after performing an etching process to form hole patterns, and the image patterns ISIP may correspond to the hole patterns. However, the inventive concepts are not limited thereto. For example, the inspection image ISI may be an image captured after performing a photo process to form hole patterns, and the image patterns ISIP may correspond to the hole patterns. Alternatively, the inspection image ISI may be an image captured after performing an etching process or photo process to form line patterns, and the image patterns ISIP may correspond to the line patterns. Alternatively, the inspection image ISI may be an image captured after performing an etching process and/or photo process to form various polygon patterns, such as L-shaped patterns and U-shaped patterns, and/or the image patterns ISIP may correspond to the various polygon patterns, such as L-shaped patterns and U-shaped patterns.

Referring to FIGS. 2A and 2B, filtering is performed on a captured image (e.g., an inspection image ISI). For example, filtering using a blurring filter or smoothing filter may be performed on the captured image. When filtering is performed on the captured image, a filtered inspection image FISI may be generated. The filtered inspection image FISI may include filtered image patterns ISIP corresponding to the image patterns ISIP.

In the filtered inspection image FISI, an image peak ISIPK, which is a peak that serves as a reference position of the filtered image pattern FISIP, is recognized in each of the filtered image patterns FISIP. For example, when, in the filtered inspection image FISI, the background includes pixels (e.g., black pixels) with low intensity and the filtered image pattern FISIP includes pixels (e.g., white or gray pixels) with high intensity, a pixel with relatively high intensity may be recognized as an image peak ISIPK, which is a reference position of the filtered image pattern FISIP. For example, in at least some embodiments, a grouping of pixels (with a number of pixels greater than a first threshold each including an intensity lower than a second threshold) may be identified as an image peak ISIPK.

Referring to FIG. 3A, the design image DSI may be a layout design file and/or a portion thereof. The design image DSI may be composed of GDSII or OASIS but is not limited thereto. The design image DSI may include a design pattern DSIP that is boundaries corresponding to image patterns ISIP.

Referring to FIGS. 3A and 3B, image processing is performed to fill the digitized area inside the outline included in the design image DSI to form a processed design image PDSI.

Image processing is performed to fill a digitized area inside a contour included in the design image DSI to thereby form a processed design image PDSI. The processed design image PDSI may include processed design patterns PDSIP corresponding to the design patterns DSIP. Each of the processed design patterns PDSIP may be a filled polygon. For example, the processed design patterns PDSIP may be patterns obtained by filling the interior of the design pattern DSIP, which define the boundaries. Thus, the processed design image PDSI may include only empty spaces and processed design patterns PDSIP that are filled spaces.

Referring to FIGS. 3B and 3C, filtering is performed on the processed design image PDSI. For example, filtering using a blurring filter or smoothing filter may be performed on the processed design image PDSI. When filtering is performed on the processed design image PDSI, a filtered design image FDSI may be generated. The filtered design image FDSI may include filtered design patterns FDSIP corresponding to the processed design patterns PDSIP. For example, filtering may be performed on the processed design image PDSI by using a blurring filter or smoothing filter to form a filtered design image FDSI.

In the filtered design image FDSI, a design peak DSIPK, which is a peak that serves as a reference position of the filtered design pattern FDSIP, is recognized in each of the filtered design patterns FDSIP. For example, when, in the filtered design image FDSI, the background includes pixels (e.g., black pixels) with low intensity and the filtered design pattern FDSIP includes pixels (e.g., white or gray pixels) with high intensity, a pixel with relatively high intensity may be recognized as a design peak DSIPK, which is a reference position of the filtered design pattern FDSIP.

Referring to FIGS. 3C and 4, peak samples PKS are selected from among design peaks DSIPK of filtered design patterns FDSIP included in the filtered design image FDSI. In some embodiments, among the design peaks DSIPK of the filtered design patterns FDSIP, three or more design peaks DSIPK may be selected as peak samples PKS. For example, 5 design peaks DSIPK among the design peaks DSIPK of the filtered design patterns FDSIP may be selected as peak samples PKS. As for the peak samples PKS, among the design peaks DSIPK, three or more design peaks DSIPK may be selected in order of highest intensity. Alternatively, as for the peak samples PKS, among the design peaks DSIPK, three or more design peaks DSIPK may be selected in order of largest filtered design patterns FDSIP including the design peaks DSIPK. In some embodiments, within the filtered design image FDSI, design peaks DSIPK that are relatively far apart but have a certain separation distance so as not to be too close to the edge of the filtered design image FDSI may be selected as peak samples PKS.

After overlapping the filtered inspection image FISI and the filtered design image FDSI, a search range SR is set from each of the peak samples PKS. In some embodiments, the search range SR may be a circular range. The radius of the search range SR may be, for example, set to a value equal to or greater than the stage accuracy of inspection equipment. In some embodiments, the stage accuracy of the inspection equipment may be tens of nanometers, and the radius of the search range SR may be 1 to 3 times the stage accuracy of the inspection equipment.

A list of candidate correction constants CCT is calculated from a position difference from each of the peak samples PKS to an image peak ISIPK included in the search range SR. The list of candidate correction constants CCT may include movement correction constants each including the distance and direction from the peak sample PKS to the image peak ISIPK included within each of the search ranges SR, rotation correction constants that are differences in directions included by two of the movement correction constants, and rotation movement correction constants obtained by combining one movement correction constant of the movement correction constants with one rotation correction constant of the rotation correction constants.

Referring to FIG. 4 and FIGS. 5A to 5C, the list of candidate correction constants CCT may include a first candidate correction constant CCT1, a second candidate correction constant CCT2, and a third candidate correction constant CCT3. Referring to FIGS. 5A to 5C, in the list of candidate correction constants CCT, three candidate correction constants CCT, that is, a first candidate correction constant CCT1, a second candidate correction constant CCT2, and a third candidate correction constant CCT3, are shown as examples. However, the number of candidate correction constants CCT included in the list of candidate correction constants CCT is not limited thereto and may be, for example, four or more.

By applying each of the first candidate correction constant CCT1, the second candidate correction constant CCT2, and the third candidate correction constant CCT3 to the filtered design image FDSI, to move the design peaks DSIPK or rotate the filtered design image FDSI including the design peaks DSIPK, the design peaks DSIPK are respectively matched to image peaks ISIPK closest thereto. The average of the distances between the peak samples PKS and the image peaks ISIPK, which are matched to each other, is calculated as a matching score. Among the first candidate correction constant CCT1, the second candidate correction constant CCT2, and the third candidate correction constant CCT3, the second candidate correction constant CCT2 with the highest matching score (that is, the smallest distance average) is selected as a primary correction constant SCT. In some embodiments, when the ratio of design peaks DSIPK without an image peak ISIPK within the search range SR from the design peak DSIPK is greater than a set specification in defect inspection performed in the manufacturing process (specification-out), a corresponding candidate correction constant CCT may be excluded from the selection of the primary correction constant SCT.

Referring to FIG. 6, a primary correction is performed by applying the selected primary correction constant SCT (see FIG. 5B) to the design image DSI (see FIG. 3A) to thereby generate a primary corrected design image DSI-C1. The primary corrected design image DSI-C1 may include design patterns DSIP and design peaks DSIPK. In some embodiments, the design patterns DSIP and design peaks DSIPK included in the primary corrected design image DSI-C1 may be generated by applying the primary correction constant SCT to each of the design patterns DSIP (see FIG. 3A) and design peaks DSIPK (see FIG. 3A) included in the design image DSI. The design patterns DSIP and design peaks DSIPK included in the primary corrected design image DSI-C1 may be referred to as primary correction design patterns and primary correction design peaks. In some embodiments, in order to ensure that the primary corrected design image DSI-C1 includes the primary correction design peaks but does not include the primary correction design patterns, the primary correction constant SCT may be applied to each of the design peaks DSIPK, which are included in the design image DSI, in the process of performing a primary correction by applying the primary correction constant SCT to the design image DSI.

Referring to FIGS. 6 and 7, a secondary correction constant is selected by matching the design peaks DSIPK included in the primary corrected design image DSI-C1 to the image peaks ISIPK. In the process of selecting the secondary correction constant, some of the design peaks DSIPK and some of the image peaks ISIPK may form matching peaks MPK, while some other image peaks ISIPK or some other design peaks DSIPK may be non-matching peaks IGPK without matching design peaks DSIPK or matching image peaks ISIPK. The matching peaks MPK may be used in the process of selecting the secondary correction constant. The non-matching peaks IGPK may not be used and may be ignored in the process of selecting the secondary correction constant. The secondary correction constant may be obtained through regression analysis. For example, the secondary correction constant may be obtained by a method of least squares or a maximum likelihood method.

A secondary correction is performed by applying the secondary correction constant to the primary corrected design image DSI-C1 to generate a secondary corrected design image DSI-C2. The secondary corrected design image DSI-C2 may include design patterns DSIP. In some embodiments, the design patterns DSIP included in the secondary corrected design image DSI-C2 may be generated by applying the secondary correction constant to each of the design patterns DSIP included in the primary corrected design image DSI-C1. The design patterns DSIP included in the secondary corrected design image DSI-C2 may be referred to as secondary correction design patterns.

By matching the design patterns DSIP included in the secondary corrected design image DSI-C2 to the image patterns ISIP, defect inspection may be performed on the captured image, which is the inspection image ISI.

Referring to FIGS. 1 to 7, the defect inspection method according to at least one embodiment uses image peaks and design peaks that are reference positions of image patterns included in a captured image and design patterns included in a design image, respectively. Therefore, compared to using image patterns and design patterns directly, or using the edges of image patterns and design patterns, using image peaks and design peaks significantly reduces the amount of information to be processed by processing circuitry, thereby increasing the speed of aligning inspection images and inspecting defects.

In the defect inspection method according to at least one embodiment, primary correction and secondary correction are performed. Because the primary correction includes simply moving and/or rotating the design peaks DSIPK, the number of calculations may be reduced (e.g., relatively small), and because the secondary correction includes performing a regression analysis, such as the method of least squares, on the primary correction result, the amount of calculations may not be large. Therefore, the speed of aligning inspection images and inspecting defects may be increased.

Figure 8:
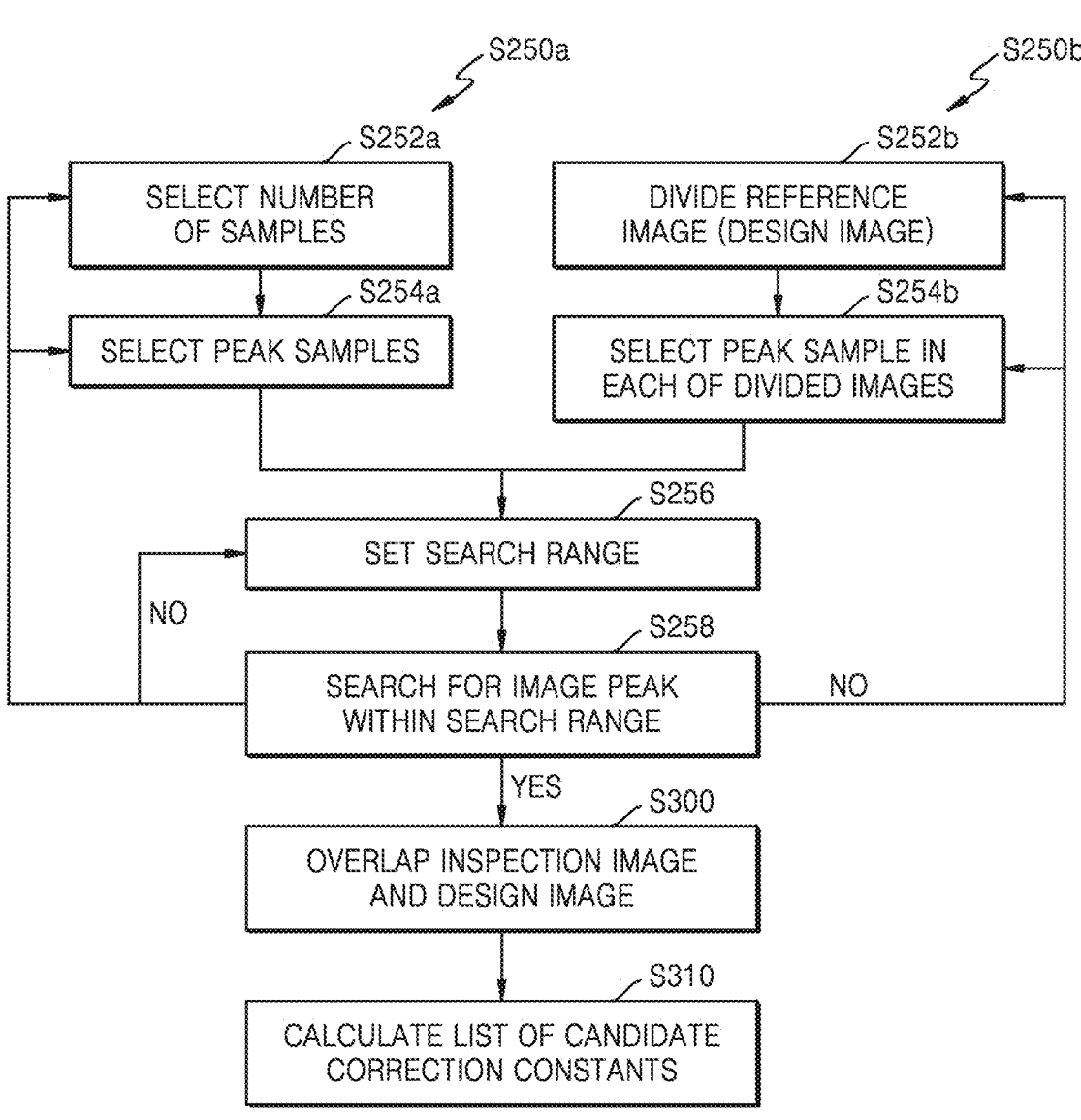
FIG. 8 is a flowchart illustrating a process of selecting peak samples to calculate candidate correction constants in a defect inspection method according to at least one embodiment.

FIG. 8 is a flowchart illustrating a process of selecting peak samples to calculate candidate correction constants in a defect inspection method according to at least one embodiment.

Referring to FIGS. 1 and 8, the process (operation S250) of selecting peak samples of the reference image, which is the design image, may be achieved through one of a first process S250*a* and a second process S250*b*.

In the first process S250*a*, as described with reference to FIGS. 1, 3C, and 4, the number of samples of design peaks DSIPK to be selected as peak samples PKS from among the design peaks DSIPK of the filtered design patterns FDSIP included in the filtered design image FDSI is selected (operation S252*a*). In some embodiments, the number of samples may be three or more. For example, three or more design peaks DSIPK among the design peaks DSIPK of the filtered design patterns FDSIP may be selected as peak samples PKS. In some embodiments, the number of samples may be five. For example, five design peaks DSIPK among the design peaks DSIPK of the filtered design patterns FDSIP may be selected as peak samples PKS.

Among the design peaks DSIPK of the filtered design patterns FDSIP included in the filtered design image FDSI, as many design peaks DSIPK as the number of selected samples are selected as peak samples PKS (operation S254*a*). In some embodiments, among the design peaks DSIPK, as many design peaks DSIPK as the number of samples may be selected as peak samples PKS in order of highest intensity. In some other embodiments, among the design peaks DSIPK, as many design peaks DSIPK as the number of samples may be selected as peak samples PKS in order of largest filtered design patterns FDSIP including the design peaks DSIPK. In some embodiments, within the filtered design image FDSI, design peaks DSIPK that are relatively far apart but have a certain separation distance so as not to be too close to the edge of the filtered design image FDSI may be selected as peak samples PKS.

As shown in FIGS. 2B, 3C, and 4, a search range SR is set from each of the peak samples PKS (operation S256). The search range SR may be set to a value equal to or greater than the stage accuracy of inspection equipment. In some embodiments, the stage accuracy of the inspection equipment may be tens of nanometers, and the search range SR may be 1 to 3 times the stage accuracy of the inspection equipment. After searching for the image peak ISIPK included within the search range SR from each of the peak samples PKS (operation S258), a list of candidate correction constants CCT is calculated from a position difference from each of the peak samples PKS to an image peak ISIPK included in the search range SR by overlapping the filtered inspection image FISI and the filtered design image FDSI (operation S300). The list of candidate correction constants CCT may include movement correction constants each including the distance and direction from the peak sample PKS to the image peak ISIPK included within each of the search ranges SR, rotation correction constants that are differences in directions included by two of the movement correction constants, and rotation movement correction constants obtained by combining one movement correction constant of the movement correction constants with one rotation correction constant of the rotation correction constants.

In the second process S250$b$, the filtered design image FDSI (see FIG. 3C) is divided to generate a plurality of divided images ISR (see FIG. 9) (operation S252$b$). The number of divided images ISR may be less than the number of design peaks DSIPK (see FIG. 9). In some embodiments, the number of divided images ISR may be greater than the square root of the number of design peaks DSIPK and less than the number of design peaks DSIPK.

A peak sample PKS (see FIG. 9) is selected from each of the divided images ISR (operation S254$b$). In some embodiments, among the design peaks DSIPK in each of the divided images ISR, a design peak DSIPK with the highest intensity may be selected as the peak sample PKS. In some other embodiments, among the design peaks DSIPK in each of the divided images ISR, a design peak DSIPK with the largest filtered design pattern FDSIP may be selected as the peak sample PKS.

Thereafter, referring to FIG. 4, after setting a search range SR from each of the peak samples PKS (operation S256) and searching for the image peak ISIPK included within the search range SR from each of the peak samples PKS (operation S258), a list of candidate correction constants CCT is calculated from a position difference from each of the peak samples PKS to an image peak ISIPK included in the search range SR by overlapping the filtered inspection image FISI and the filtered design image FDSI (operation S300).

In each of the first process (operation S250$a$) and the second process (operation S250$b$), when there are no or too few image peaks ISIPK (e.g., less than a threshold value) found within the search range SR, a new increased search range SR may be selected (operations S252$a$ and S252$b$).

Alternatively, in each of the first process (operation S250$a$) and the second process (operation S250$b$), when there are no or few image peaks ISIPK searched within the search range SR, new peak samples PKS may be selected (operation S254$a$ and S254$b$). For example, when a design peak DSIPK with the highest intensity is selected as the peak sample PKS, a design peak DSIPK with the next highest intensity may be newly selected as the peak sample PKS. For example, when a design peak DSIPK with the largest filtered design pattern FDSIP is selected as the peak sample PKS, a design peak DSIPK with the next largest filtered design pattern FDSIP may be newly selected as the peak sample PKS.

Figure 9:
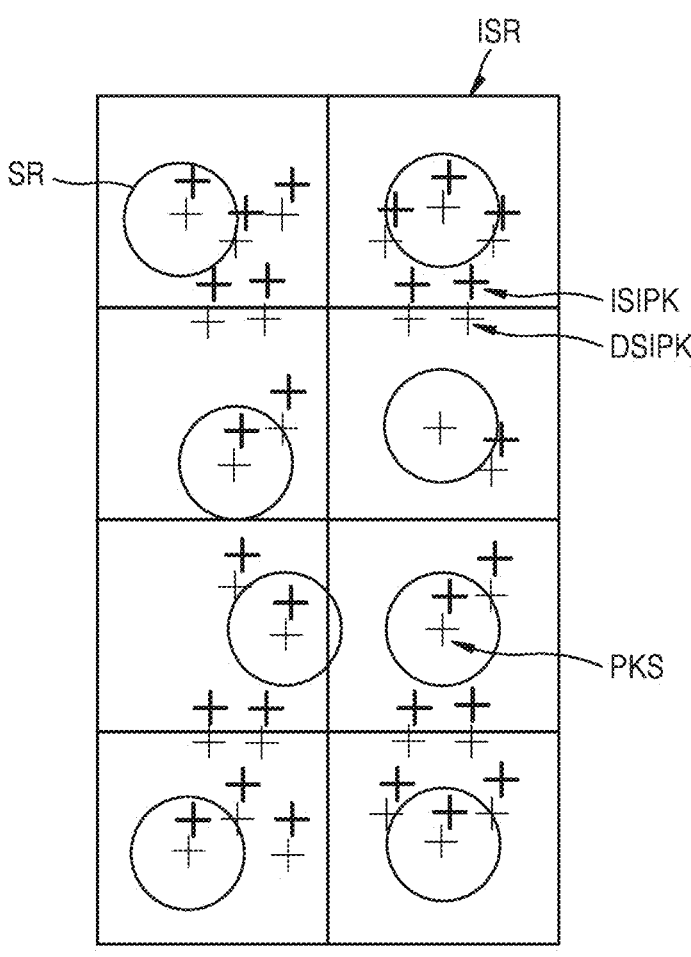
FIG. 9 is a conceptual diagram illustrating a process of selecting peak samples to calculate candidate correction constants in a defect inspection method according to at least one embodiment.

FIG. 9 is a conceptual diagram illustrating a process of selecting peak samples to calculate candidate correction constants in a defect inspection method according to at least one embodiment.

Referring to FIG. 9, the filtered design image FDSI in FIG. 3C is divided to generate a plurality of divided images ISR (operation S252$b$). The number of divided images ISR may be less than the number of design peaks DSIPK (see FIG. 9). In some embodiments, the number of divided images ISR may be greater than the square root of the number of design peaks DSIPK and less than the number of design peaks DSIPK.

A peak sample PKS is selected from each of the divided images ISR. In some embodiments, among the design peaks DSIPK in each of the divided images ISR, a design peak DSIPK with the highest or next-highest intensity may be selected as the peak sample PKS. In some other embodiments, among the design peaks DSIPK in each of the divided images ISR, a design peak DSIPK with the largest or next-largest filtered design pattern FDSIP may be selected as the peak sample PKS.

Thereafter, referring to FIGS. 4 and 5A to 5C, after setting a search range SR from each of the peak samples PKS and searching for the image peak ISIPK included within the search range SR from each of the peak samples PKS, a list of candidate correction constants CCT may be calculated from a position difference from each of the peak samples PKS to an image peak ISIPK included in the search range SR.

Figure 10:
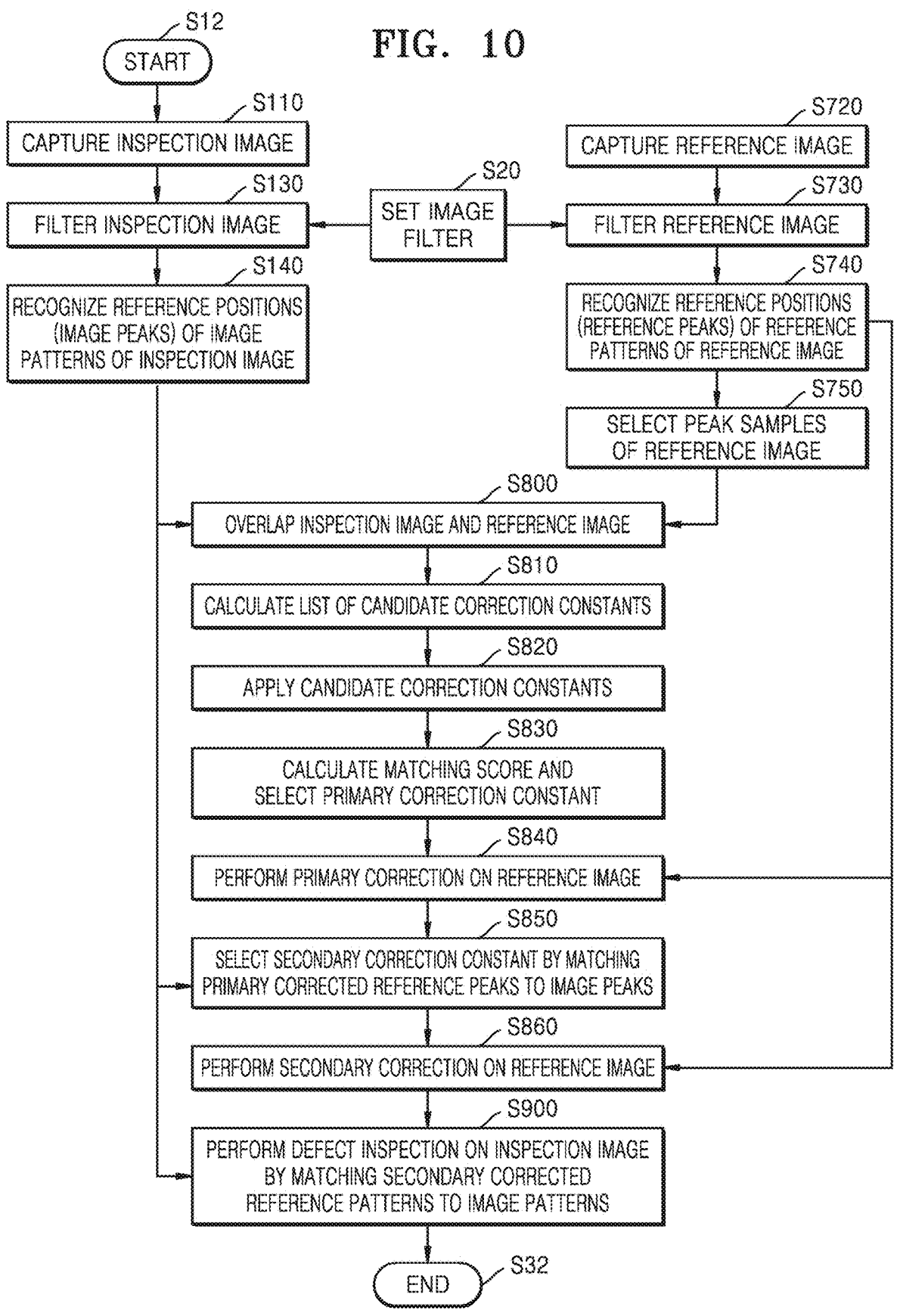
FIG. 10 is a schematic flowchart showing a defect inspection method according to at least one embodiment.
Figure 11A:
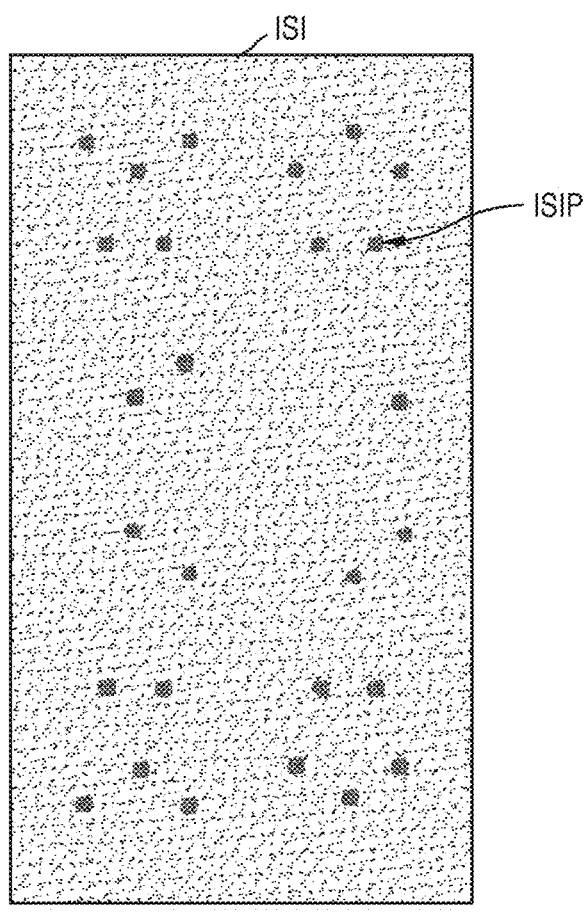
FIGS. 11A and 11B and FIGS. 12A and 12B are conceptual diagrams illustrating a process of recognizing a reference position from an inspection image and a reference image, which is an image to be compared, in a defect inspection method according to at least one embodiment.
Figure 11B:
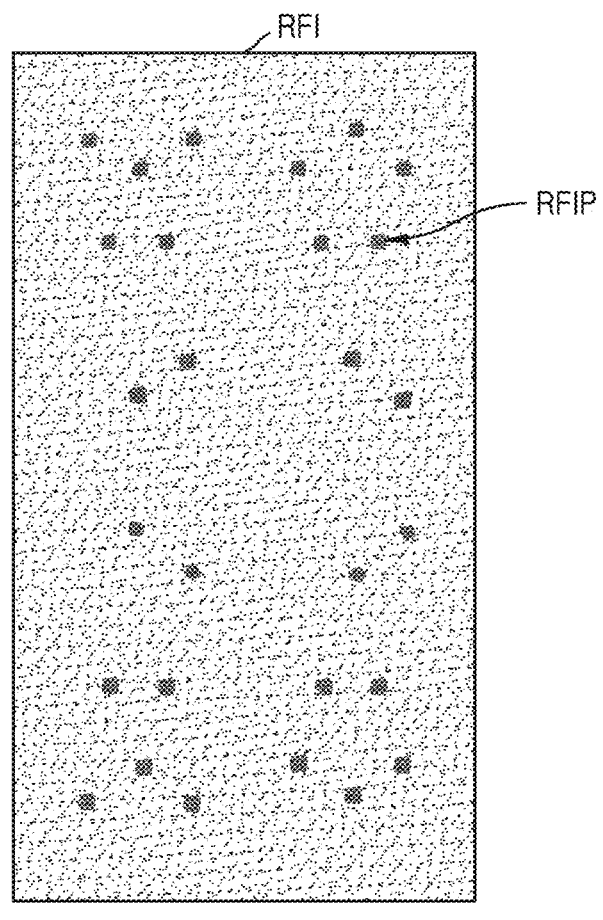
Figure 12A:
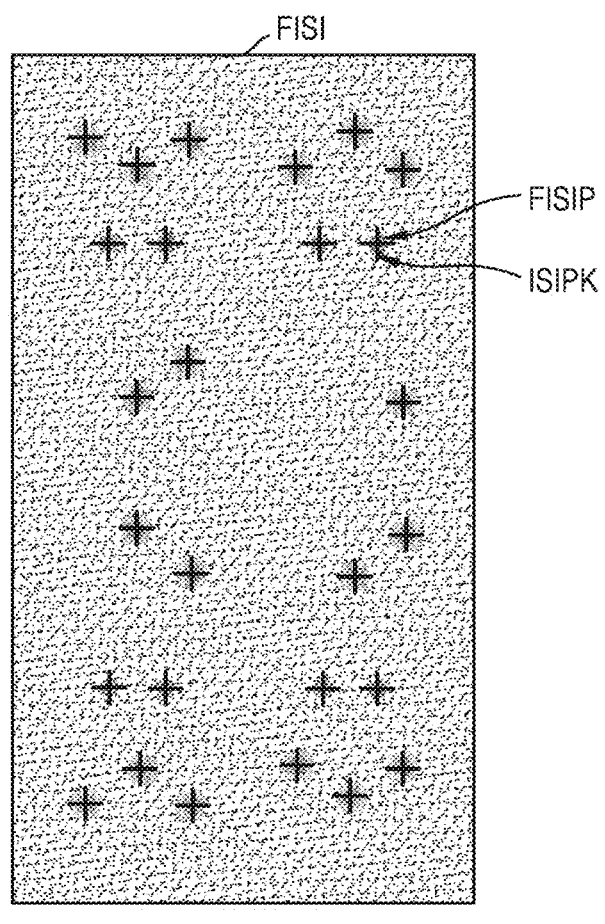
Figure 12B:
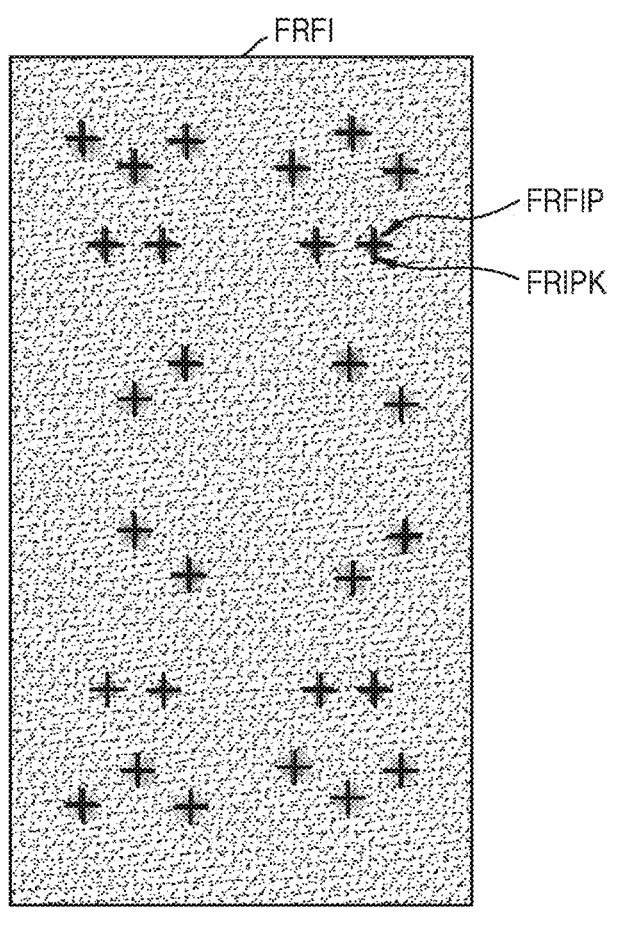

FIG. 10 is a schematic flowchart showing a defect inspection method according to at least one embodiment, and FIGS. 11A and 11B and FIGS. 12A and 12B are conceptual diagrams illustrating a process of recognizing a reference position from an inspection image ISI and a reference image, which is an image to be compared, in a defect inspection method according to at least one embodiment.

Referring to FIGS. 10, 11A and 11B, and 12A and 12B, the inspection image ISI is captured (operation S110) to start alignment and defect inspection of the inspection image ISI (operation S12). The inspection image ISI may include various types of image patterns ISIP. Filtering is performed on the captured image, which is the inspection image ISI (operation S130). When filtering is performed on the captured image, a filtered inspection image FISI may be generated. The filtered inspection image FISI may include filtered image patterns ISIP corresponding to the image patterns ISIP. An image filter may be set (operation S20) to perform filtering on the captured image (operation S130). In the filtered inspection image FISI, an image peak ISIPK (e.g., a peak that serves as a reference position of the filtered image pattern FISIP) is recognized in each of the filtered image patterns FISIP (operation S140).

Separately, a reference image RFI is captured (operation S720). The reference image RFI may include various types of reference patterns RFIP. Filtering is performed on the reference image RFI (operation S730). When filtering is performed on the reference image RFI, a filtered reference image FRFI may be generated. The filtered reference image FRFI may include filtered reference patterns FRFIP corresponding to the image patterns ISIP. An image filter may be set (operation S20) to perform filtering on the reference image RFI (operation S730). In the filtered reference image FRFI, a reference peak RFIPK, which is a peak that serves as a reference position of the filtered reference pattern FRFIP, is recognized in each of the filtered reference patterns FRFIP (operation S740).

The reference image RFI may be an inspection image ISI confirmed to have no defects from among the captured inspection images ISI described with reference to FIGS. 1 to 9. The filtered reference image FRFI, including the filtered reference pattern FRFIP for the reference image RFI, and the reference peak RFIPK may have already been created. For example, with respect to the reference image RFI, a process of generating the filtered reference image FRFI including the filtered reference pattern FRFIP (operation S730), and a process of recognizing the reference peak RFIPK (operation S740) may have already been performed before capturing the inspection image ISI.

Among the reference peaks RFIPK of the filtered reference patterns FRFIP included in the filtered reference image FRFI, peak samples PKS (see FIG. 4) are selected (operation S750). The process of selecting peak samples PKS from among the reference peaks RFIPK (operation S750) is substantially the same as the process of selecting peak samples PKS in FIG. 4 from among the design peaks DSIPK described with reference to FIG. 1.

After overlapping the filtered inspection image FISI and the filtered reference image FRFI (operation S800), a list of candidate correction constants CCT (see FIG. 4) is calculated from a position difference from each of the peak samples PKS to an image peak ISIPK included in the search range SR (operation S810). In addition, the candidate correction constants CCT are applied to the filtered reference image FRFI to respectively match the peak samples PKS to image peaks ISIPK closest thereto (operation S820). The average of the distances between the peak samples PKS and the image peaks ISIPK, which are matched to each other, is calculated as a matching score, a primary correction constant SCT (see FIG. 5B) is selected based on the matching score (operation S830), and a primary correction is performed by applying the selected primary correction constant SCT to the reference image RFI (operation S840). A secondary correction constant may be selected by matching primary corrected reference peaks RFIPK to the image peaks ISIPK (operation S850), a secondary correction may be performed by applying the selected secondary correction constant to the primary corrected reference image RFI, and by matching the reference patterns RFIP included in the secondary corrected reference image RFI to the image patterns ISIP, defect inspection may be performed on a captured image, which is the inspection image ISI (operation 900). For example, when there is no image pattern ISIP matching the reference pattern RFIP or there is no reference pattern RFIP matching the image pattern ISIP, it may be determined that there is a defect and defect inspection may be terminated (operation S32).

Figure 13:
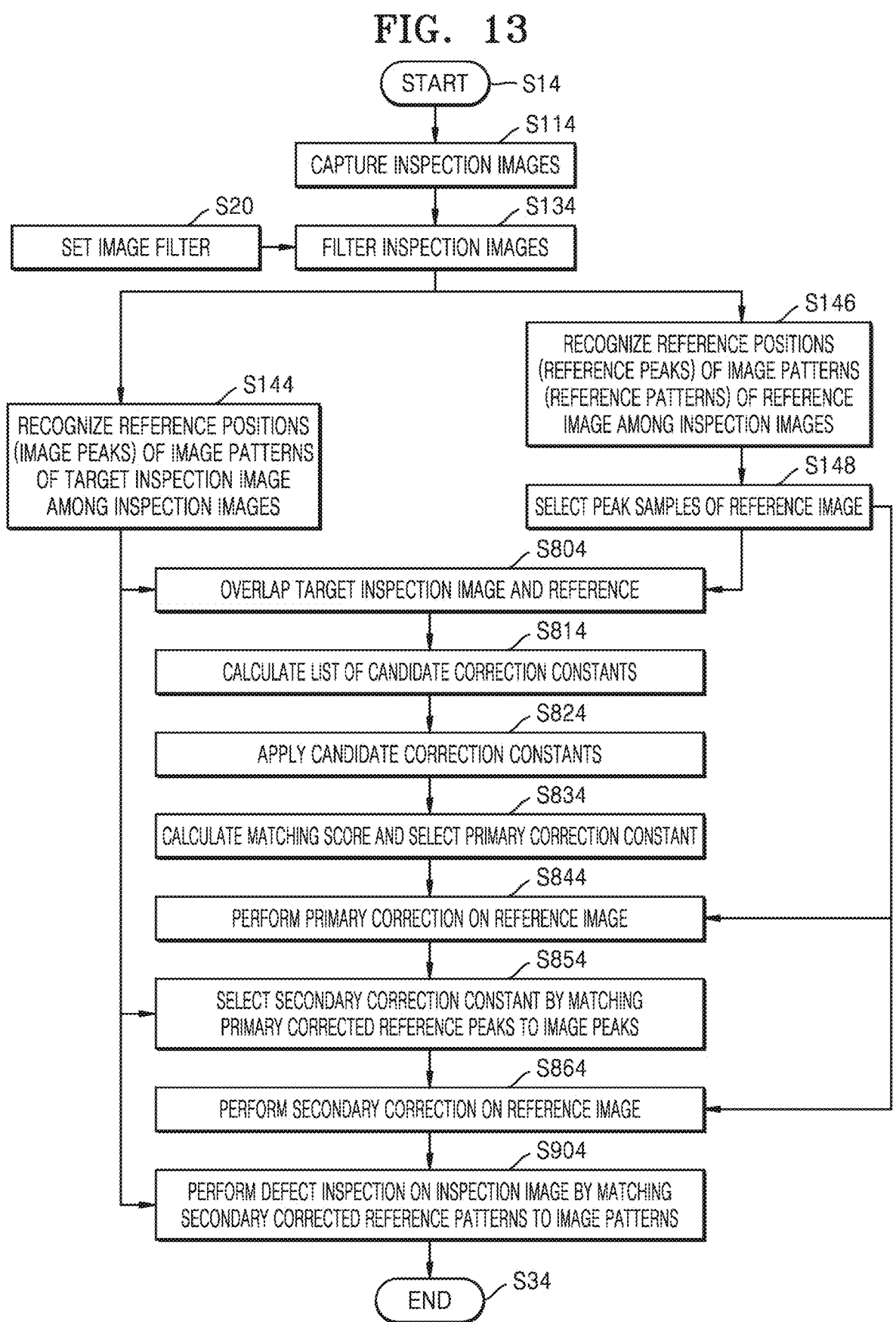
FIG. 13 is a schematic flowchart showing a defect inspection method according to at least one embodiment.
Figure 14:
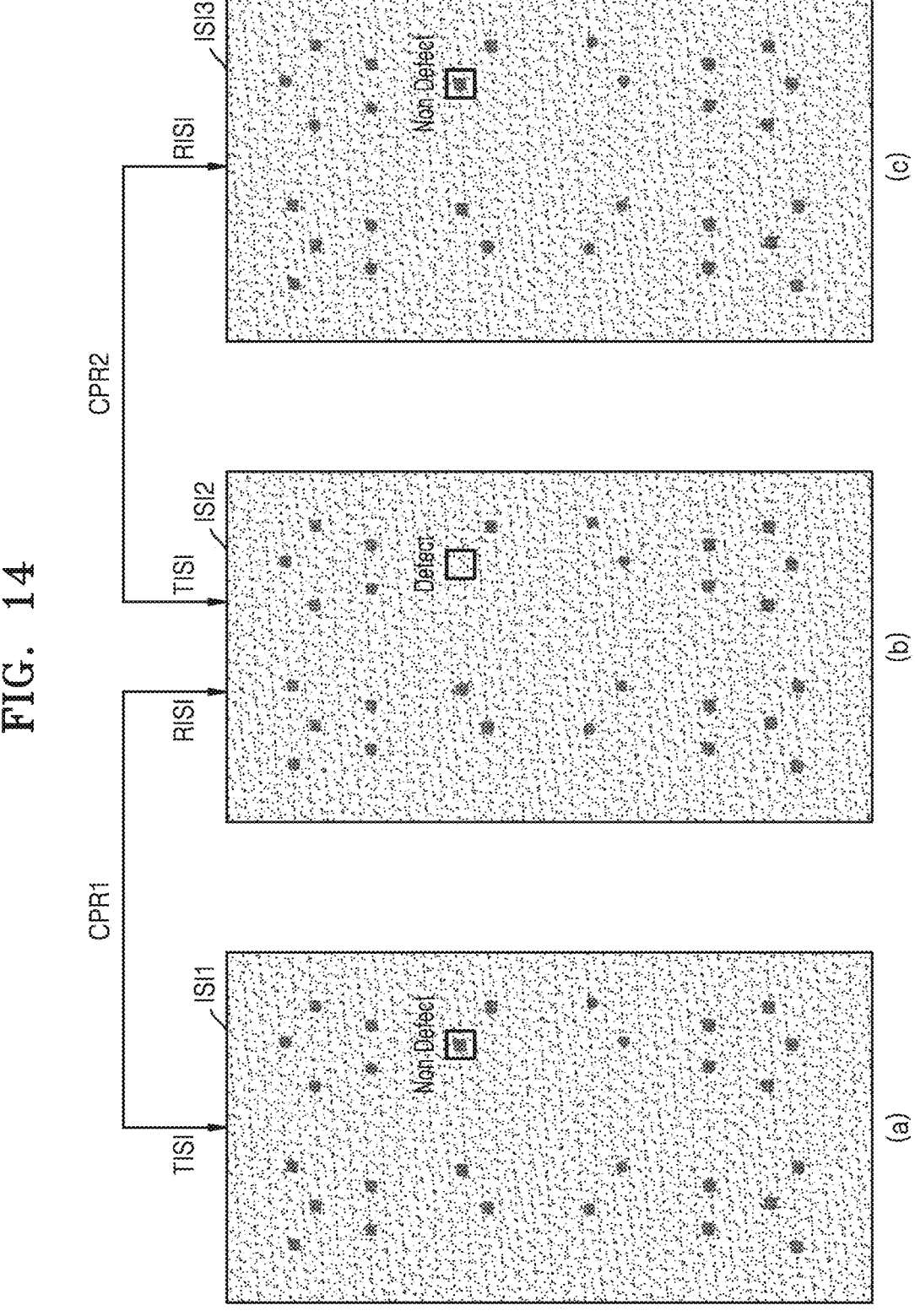
FIG. 14 is a conceptual diagram illustrating a defect inspection method according to at least one embodiment.

FIG. 13 is a schematic flowchart showing a defect inspection method according to at least one embodiment, and FIG. 14 is a conceptual diagram illustrating a defect inspection method according to at least one embodiment.

Referring to FIGS. 13 and 14, inspection images ISI1, ISI2, and ISI3 are captured (operation S114) to start alignment and defect inspection of the inspection images ISI1, ISI2, and ISI3 (operation S114). Filtering is performed on the captured images, which are the inspection images ISI1, ISI2, and ISI3 (operation S134). An image filter may be set (operation S20) to perform filtering on the captured images that are the inspection images ISI1, ISI2, and ISI3 (operation S134). One of the captured images may be selected as a target inspection image TISI, and the other may be selected as a reference image RISI to be compared, and then a similar method may be performed by corresponding the target inspection image TISI and the reference image RISI to be compared to the inspection image ISI and the reference image RFI described with reference to FIGS. 10 and 11. In the present specification, 'target inspection' included in the name of a member may be replaced with 'inspection'.

For example, image peaks ISIPK (see FIG. 11), which are reference positions of the image pattern ISIP (see FIG. 11), are recognized from the target inspection image TISI (operation S144), reference peaks, which are reference positions of a reference pattern corresponding to the reference peak RFIPK (see FIG. 12) that is a reference position of the reference pattern RFIP (see FIG. 12), are recognized from the reference image RISI (operation S146), and the peak samples PKS (see FIG. 4) of the reference image RISI are selected (operation S148). Thereafter, a list of candidate correction constants CCT (see FIG. 4) is calculated from a position difference from each of the peak samples PKS to an image peak ISIPK included in the search range SR (FIG. 4) (operation S814) by overlapping the filtered target inspection image TISI and the filtered reference image RISI (operation S804). In addition, the candidate correction constants CCT are applied to the filtered inspection image FISI to respectively match the peak samples PKS to image peaks ISIPK closest thereto (operation S824). The average of the distances between the peak samples PKS and the image peaks ISIPK, which are matched to each other, is calculated as a matching score, a primary correction constant SCT (see FIG. 5B) is selected based on the matching score (operation S834), and a primary correction is performed by applying the selected primary correction constant SCT to the reference image RISI (operation S844). A secondary correction constant may be selected by matching primary corrected reference peaks to the image peaks ISIPK (operation S854), a secondary correction may be performed by applying the selected secondary correction constant to the primary corrected reference image RISI, and by matching reference patterns included in the secondary corrected reference image RISI to the image patterns ISIP, defect inspection may be performed on the target inspection image TISI (operation 904).

For example, when a first captured image ISI1, the second captured image ISI2, and the third captured image ISI3 are captured, the first captured image ISI1 may be selected as the target inspection image TISI and the second captured image ISI2 may be selected as the reference image RISI. In addition, the second captured image ISI2 may be selected as the target inspection image TISI and the third captured image ISI3 may be selected as the reference image RISI. That is, each of the first captured image ISI1, the second captured image ISI2, and the third captured image ISI3 may be selected as the target inspection image TISI and as the reference image RISI. Considering the second captured image ISI2, when the second captured image ISI2 is selected as the reference image RISI, the first captured image ISI1 may be selected as the target inspection image TISI, and, when the second captured image ISI2 is selected as the target inspection image TISI, the third captured image ISI3 may be selected as the reference image RISI.

A first matching CPR1 may be performed between the first captured image ISI1 and the second captured image ISI2, and a second matching CPR2 may be performed between the second captured image ISI2 and the third captured image ISI3. When the difference between the first captured image ISI1 and the second captured image ISI2 in the first matching CPR1 is the same as the difference between the second captured image ISI2 and the third captured image ISI3 in the second matching CPR2, it may be determined that the second captured image ISI2 has a defect.

When a difference corresponding to the difference between the first captured image ISI1 and the second captured image ISI2 is not present between the first captured image ISI1 and the third captured image ISI3, or when a difference corresponding to the difference between the second captured image ISI2 and the third captured image ISI3 is not present between the first captured image ISI1 and the third captured image ISI3, it may be determined that there is no defect.

Among the captured images that are the inspection images ISI1, ISI2, and ISI3, three captured images are selected and compared to each other. In this case, when one captured image is different from each of the other two captured images, it may be determined that there is a defect, and when there is no difference between one captured image and one or both of the other two captured images, it may be determined that there is no defect, and then, the defect inspection may be ended (operation S34).

In at least some embodiments, a semiconductor device manufacturing and/or inspection device may be configured to perform the above method. For example, the semiconductor device manufacturing and/or inspection device may include processing circuitry, such as hardware including logic circuits; a hardware/software combination such as a processor executing software; or a combination thereof, configured to control and/or perform the above methods and to control the manufacturing of the semiconductor device based on a result of the defect inspection. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In at least some embodiments, the processing circuitry may include at least one processor and memory storing instructions, which when executed by the at least one processor, causes the at least one processor to perform the above methods.

While the inventive concepts have been particularly shown and described with reference to embodiments thereof, it will be understood that various changes in form and details may be made therein without departing from the spirit and scope of the following claims.

What is claimed is:

1. A defect inspection method comprising:
filtering an inspection image such that image peaks in the inspection image are identified as reference positions of image patterns included in the inspection image;
filtering a reference image such that reference peaks in the reference image are identified as reference positions of reference patterns included in the reference image;
selecting at least a subset of the reference peaks as peak samples;
overlapping the filtered inspection image and the filtered reference image;
determining candidate correction constants based on differences in position from the peak samples to corresponding image peaks included in a search range of the overlapped filtered inspection and filtered reference images;
selecting a primary correction constant, from among the candidate correction constants, by applying the candidate correction constants to each of the reference peaks of the reference image;
applying the primary correction constant to the reference image and selecting a secondary correction constant by matching the image peaks to the reference peaks included in a primary corrected reference image;
applying the secondary correction constant to the primary corrected reference image and forming a secondary corrected reference image aligned with the inspection image; and
performing a defect inspection on the inspection image by matching the image patterns to reference patterns included in the secondary corrected reference image.

2. The defect inspection method of claim 1, wherein at least one of the filtering the inspection image or filtering the reference image includes using at least one of a blurring filter or a smoothing filter.

3. The defect inspection method of claim 2, wherein
the image peaks correspond to pixels with a higher intensity compared to background pixels included in the inspection image, and
the reference peaks correspond to pixels of a higher intensity compared to background pixels included in the reference image.

4. The defect inspection method of claim 3, wherein the selecting the peak samples includes at least one of selecting three or more reference peaks in order of highest intensity, or selecting three or more reference patterns in order of largest reference patterns including the reference peaks.

5. The defect inspection method of claim 3, wherein the selecting the peak samples includes:
generating divided images by dividing the reference image; and
selecting a peak sample within each of the divided images.

6. The defect inspection method of claim 1, wherein the inspection image includes a scanning electron microscope (SEM) image.

7. The defect inspection method of claim 6, wherein the reference image is configured to correspond to inspection images including images captured after at least one of an etching process or a photo process for forming hole patterns.

8. The defect inspection method of claim 1, wherein the reference image is obtained by extracting a portion corresponding to the inspection image from layout design files composed of Graphic Design System-II stream format (GDSII) or Open Artwork System Interchange Standard (OASIS).

9. The defect inspection method of claim 8, wherein the filtering the reference image includes
performing image processing to fill an interior of a contour of each of the reference patterns included in the reference image, and
filtering the reference image on which the image processing has been performed.

10. The defect inspection method of claim 1, wherein the secondary correction constant is obtained by at least one of a least squares method or a maximum likelihood method.

11. A defect inspection method comprising:
capturing an inspection image including image patterns using a scanning electron microscope (SEM);
filtering the inspection image such that image peaks in the inspection image are identified as reference positions of the image patterns;
performing image processing on a design image to fill an interior of a closed contour of design patterns included in the design image;
filtering the image-processed design image such that design peaks are identified as reference positions of the design patterns;
selecting at least a subset of the design peaks as peak samples;
overlapping the filtered inspection image and the filtered design image;
determining candidate correction constants based on differences in position from the peak samples to corresponding image peaks included in a search range of the overlapping filtered inspection and filtered design images;

selecting a primary correction constant, from among the candidate correction constants, by applying the candidate correction constants to each of the image peaks to the design peaks of the design image;

applying the primary correction constant to the design image and selecting a secondary correction constant by matching the image peaks to the design peaks included in a primary corrected design image;

applying the secondary correction constant to the primary corrected design image and forming a secondary corrected design image aligned with the inspection image; and performing a defect inspection on the inspection image by matching the image patterns to design patterns included in the secondary corrected design image.

12. The defect inspection method of claim 11, wherein the design image is obtained by extracting a portion corresponding to the inspection image from layout design files composed of Graphic Design System-II stream format (GDSII) or Open Artwork System Interchange Standard (OASIS).

13. The defect inspection method of claim 11, wherein each of the filtering the inspection image and the filtering the image-processed design image include using a blurring filter.

14. The defect inspection method of claim 11, wherein the search range is a circular range, and a radius of the search range is equal to or greater than stage accuracy of the SEM that captured the inspection image.

15. The defect inspection method of claim 11, wherein, the selecting of the secondary correction constant includes not using an image peak without a matching design peak or a design peak without a matching image peak, and using all design peaks and image peaks that match each other.

16. The defect inspection method of claim 15, wherein the selecting the secondary correction constant includes a regression analysis.

17. The defect inspection method of claim 11, wherein the inspection image is captured after performing at least one of an etching process or photo process for forming hole patterns, and the image patterns correspond to the hole patterns.

18. A defect inspection method comprising:

capturing an inspection image including image patterns using a scanning electron microscope (SEM);

filtering the inspection image using a blurring filter such that image peaks in the inspection image are identified as reference positions of the image patterns;

performing image processing to fill an interior of a closed contour of each of design patterns on a design image including the design patterns, the design image obtained by extracting a portion corresponding to the inspection image from layout design files composed of Graphic Design System-II stream format (GDSII);

filtering the image-processed design image using a blurring filter such that design peaks in the design image are identified as reference positions of the design patterns;

selecting 3 to 5 of the design peaks as peak samples;

overlapping the filtered inspection image and the filtered design image;

determining candidate correction constants based on differences in from position from the peak samples to corresponding image peaks included in a search range of the overlapping filtered inspection and filtered design images;

selecting a primary correction constant from among the candidate correction constants by applying the candidate correction constants to each of the image peaks to the design peaks of the design image;

applying the primary correction constant to the design image and selecting a secondary correction constant by matching the image peaks to the design peaks included in a primary corrected design image;

applying the secondary correction constant to the primary corrected design image and forming a secondary corrected design image aligned with the inspection image; and performing a defect inspection on the inspection image by matching the image patterns to design patterns included in the secondary corrected design image.

19. The defect inspection method of claim 18, wherein the selecting of the primary correction constant from among the candidate correction constants includes selecting, as the primary correction constant, a candidate correction constant with a smallest average distance between the design peaks and the image peaks, which are matched to each other.

20. The defect inspection method of claim 18, wherein the secondary correction constant is obtained using a least squares method.

* * * * *